UNITED STATES PATENT OFFICE.

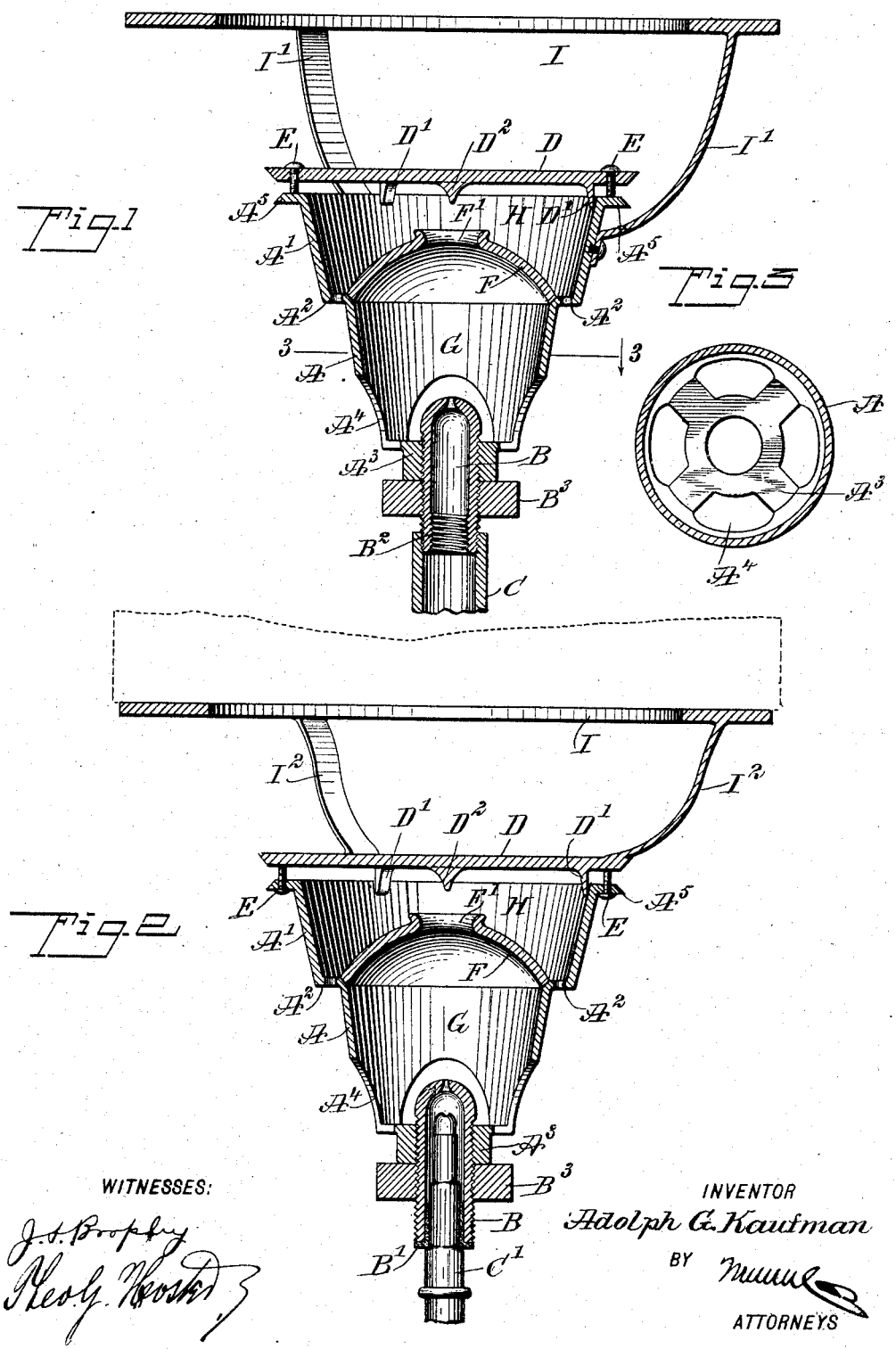

ADOLPH G. KAUFMAN, OF NEW YORK, N. Y., ASSIGNOR TO THE A. G. KAUFMAN MANUFACTURING COMPANY, OF NEW YORK, N. Y., A CORPORATION OF NEW YORK.

BURNER.

No. 865,183.  Specification of Letters Patent.  Patented Sept. 3, 1907.

Application filed July 7, 1904. Serial No. 215,623.

*To all whom it may concern:*

Be it known that I, ADOLPH G. KAUFMAN, a citizen of the United States, and a resident of the city of New York, borough of Manhattan, in the county and State of New York, have invented a new and Improved Burner, of which the following is a full, clear, and exact description.

The object of the invention is to provide a new and improved burner for use on cooking stoves, gas arms and the like, and arranged to insure a complete mixture of the gas and air, to produce an exceedingly strong flame, capable of quickly and highly heating culinary and other vessels, soldering irons, sad irons, etc., the burner consuming but a small amount of gas.

The invention consists of novel features and parts and combinations of the same, as will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement, arranged for use as a stove burner; Fig. 2 is a similar view of the same as applied to an ordinary gas arm; and Fig. 3 is a sectional plan view of the improvement, on the line 3—3 of Fig. 1.

The body of the gas burner illustrated in the drawings is preferably formed of two hollow inverted frustums of cones A, A', of which the upper or base end of the lower frustum of a cone A is integrally connected by a horizontal apertured flange $A^2$ with the apex or lower end of the upper frustum of a cone A'. The apex end of the lower frustum of a cone A is provided with an integral bottom $A^3$, and air inlets $A^4$ are formed partly in the said bottom $A^3$ and partly in the side wall of the frustum of a cone A, as plainly illustrated in the drawings. The bottom $A^3$ is provided with a central threaded bore, in which screws a nozzle B, connected with a suitable gas supply; for instance as shown in Fig. 1, the lower end of the nozzle screws into a gas supply pipe C, and as illustrated in Fig. 2, the nozzle B fits onto an ordinary burner C', with a packing ring B' of asbestos or the like interposed between the nozzle and the burner. If desired, the nozzle B may be directly screwed onto the threaded end of a gas arm from which the burner C' has been removed, the said nozzle being for this purpose provided with an interior screw thread $B^2$, as plainly illustrated in Fig. 1.

The nozzle B may be screwed up or down in the bottom $A^3$ of the burner body, to bring the upper or discharge end of the nozzle higher up or lower down within the frustum of a cone A, according to the pressure of the gas in the gas supply; that is, if the pressure is low, the nozzle is screwed up, and when the pressure is high, the nozzle is screwed downward. After the nozzle has been adjusted, it is securely locked in position by a jam nut $B^3$, abutting against the under side of the bottom $A^3$.

On the upper or base end of the upper frustum of a cone A' is formed an outwardly extending flange $A^5$, forming with the top plate D an annular discharge passage for the inflammable mixture of gas and air, the said top plate extending across the upper end of the frustum of a cone A', and the said top plate is supported and held vertically adjustable by screws E, either screwing in the top plate and resting on the upper face of the flange $A^5$, as shown in Fig. 1, or the said screws may screw in the flange $A^5$, to engage the under side of the top plate D, as shown in Fig. 2. By adjusting the screws, the top plate D may be moved nearer to or farther from the flange $A^5$, to increase or decrease the size of the annular discharge passage for the inflammable mixture. Lugs D' depend from the top plate and fit against the inner face of the wall of the frustum of a cone A', to hold the top plate against lateral movement.

The peripheral edge of the top plate D is beveled upwardly and outwardly, and the peripheral edge of the flange $A^5$ is beveled downwardly and outwardly, as plainly shown in the drawings, so that the bevels of the top plate and the flange $A^5$ form a flaring mouth for the ready discharge and spreading of the flame produced by the burning of the inflammable mixture passing through the said annular discharge passage.

The upper edge of the lower frustum of a cone A is beveled, to form an annular seat for the dome-shaped top F, provided with a central outlet F' in axial alinement with the nozzle B, the said outlet having an outwardly and upwardly curved wall, as plainly indicated in the drawings. In axial alinement with the opening F' is arranged a conical spreader or deflector $D^2$, depending integrally from the under side of the top plate D.

By the arrangement described, two chambers G and H are formed within the body of the burner, and the chamber G is a preliminary mixing chamber for mixing the air entering the openings $A^4$ with the gas issuing from the nozzle B, and the chamber H is a heating and final mixing chamber, into which passes the mixture of gas and air from the chamber G by way of the central outlet F'. Now the mixture, in rising in the chamber H, is uniformly spread apart by the deflector $D^2$, so as to pass in a downward direction along the upper surface of the dome-shaped top F, to be then mixed with atmospheric air entering through the apertures in the flange $A^2$. The mixture in the chamber H is burned at the annular discharge passage between the flange $A^5$ and the top D, and as the top is heated by the flame, it is evident that the mixture of the air and gas passing into the chamber H and coming in contact with the under side of the said top plate D is heated before reaching the annular discharge passage above mentioned.

By having the chamber H in the shape described, it is evident that the mixture of gas, while being heated, is free to expand, and at the same time a large amount of air, entering through the apertured flange A², is added to the mixture, to insure a highly heated and inflammable gas.

By heating the mixture of air and gas passing into the chamber H from the chamber G, a suction action is produced, for drawing air through the openings in the flange A² into the chamber H, to insure a thorough mixture of this additional air with the mixture already in the chamber H.

The culinary vessel or other article to be heated is placed on a support I, preferably in the form of a ring extending a suitable distance above the burner and connected by arms I', either with the wall of the frustum of a cone A', as illustrated in Fig. 1, or the arms I² of the said support may form integral parts of the top plate D, as illustrated in Fig. 2.

Having thus described my invention, I claim as new and desire to secure by Letters Patent:

1. A gas burner comprising a preliminary mixing chamber connected with a gas supply and having air inlets, the mixing chamber being approximately in the form of a hollow inverted frustum of a cone and having a dome-shaped and apertured top, a heating and final mixing chamber around and over the said top, the said heating and final mixing chamber having outwardly flaring sides and provided with air inlets at the lower end, and a top plate spaced from the top edge of the chamber to form a discharge passage at the side, directly under the top, as set forth.

2. A gas burner comprising a preliminary mixing chamber connected with a gas supply and having air inlets, the mixing chamber being approximately in the form of a hollow inverted frustum of a cone and having a dome-shaped and apertured top, a heating and final mixing chamber around and over the said top, the said heating and final mixing chamber being approximately in the form of a hollow inverted frustum of a cone and having air inlets at the lower end, and a top plate spaced from the top of the said chamber to form a discharge passage at the side, directly under the top, said top plate being provided with a conical spreader depending therefrom, in alinement with the opening in the top of the mixing chamber, as set forth.

3. A gas burner comprising a preliminary mixing chamber connected with a gas supply and having air inlets, the top of the mixing chamber being dome-shaped and apertured, a heating and final mixing chamber around and over the said top, the said heating and final mixing chamber having air inlets at the lower end, and a top plate spaced from the top of the said chamber to form a discharge passage at the side, directly under the top, and means for adjustably holding the said plate in position, to regulate the size of the said discharge passage, as set forth.

4. In a gas burner a mixing chamber, approximately in the form of a hollow inverted frustum of a cone, and a heating and final mixing chamber in the form of an inverted frustum of a cone, integrally connected at its apex end by an apertured flange with the base end of the said mixing chamber, as set forth.

5. A gas burner comprising a mixing chamber, approximately in the form of a hollow inverted frustum of a cone, a heating and final mixing chamber in the form of an inverted frustum of a cone, integrally connected at its apex end by an apertured flange with the base end of the said mixing chamber, a dome-shaped top removably seated on the base end of the mixing chamber, and a top plate for the heating and mixing chamber, spaced from the top edge of the chamber, to form a discharge passage, as set forth.

6. A gas burner, comprising a mixing chamber approximately in the form of a hollow inverted frustum of a cone, a heating and final mixing chamber in the form of an inverted frustum of a cone and connected at its apex by an apertured flange with the base of the mixing chamber, a dome-shaped top on the base end of the mixing chamber and having a central opening therein, and a top plate spaced from the top of the mixing chamber to form a discharge passage, said top plate being provided with a deflector on its under face above the opening of the said dome.

7. A gas burner, comprising a chamber approximately in the form of an inverted frustum of a cone, and having openings formed partly in its bottom and sides, a second chamber in the form of an inverted frustum of a cone above the first chamber and connected with the base thereof by an apertured flange, a dome-shaped top on the base of the first chamber and having a central outwardly flaring opening, an adjustable top plate supported above the top of the second chamber to form between it and said chamber a discharge passage, said top plate having a deflector on its under side above the opening of the dome, and an adjustable nozzle projecting into the first chamber.

8. In a gas burner, the combination of a preliminary mixing chamber provided with a dome-shaped top having a central opening, a heating and final mixing chamber into which the dome-shaped top of the preliminary chamber projects above the bottom thereof, said heating and final mixing chamber having air inlets and provided with an outwardly projecting flange at its upper end, a top plate for the heating and final mixing chamber, said plate having depending lugs on its inner face fitting against the inner face of the said chamber and a deflector over the central opening of the dome-shaped top of the preliminary mixing chamber, and screws engaging the top plate and the flange of the heating and final mixing chamber for adjusting the said plate with respect to the top of said chamber.

In testimony whereof I have signed my name to this specification in the presence of two subscribing witnesses.

ADOLPH G. KAUFMAN.

Witnesses:
 THEO. G. HOSTER,
 EVERARD BOLTON MARSHALL.